United States Patent Office 3,287,326
Patented Nov. 22, 1966

3,287,326
GLYCEROL DERIVATIVES OF AZELAALDEHYDIC ACID AND POLY(ESTER-ACETALS) THEREFROM
William R. Miller, John C. Cowan, and Everett H. Pryde, Peoria, Ill., assignors to the United States of America as represented by the Secretary of Agriculture
No Drawing. Original application Aug. 29, 1963, Ser. No. 305,556. Divided and this application Aug. 11, 1965, Ser. No. 485,668
2 Claims. (Cl. 260—78.3)

This application is a divisional of application Serial No. 305,556, filed August 29, 1963.

A nonexclusive, irrevocable, royalty-free license in the invention herein described, throughout the world for all purposes of the United States Government, with the power to grant sublicenses for such purposes, is hereby granted to the Government of the United States of America.

This invention relates to novel glyceryl ester-acetals that under mild hydrolysis conditions (which would be expected to yield the corresponding α-monoglycerides) unexpectedly form free glyceryl-ester-aldehyde molecules that homopolymerize to form rather low molecular weight, poly(ester-acetal) prepolymers that can be further polymerized to provide novel polyesters having utility as film-formers and for the preparation of fibers and coatings. This invention also relates to glyceryl acetals of methyl azelaaldehydate which can be directly polymerized to novel poly(ester-acetals).

In copending application, Serial No. 187,994, filed April 16, 1962, now U.S. Patent No. 3,183,215 are disclosed novel poly(ester-acetal) prepolymers obtained by reacting in certain proportions the pentaerythritol acetal of methyl azelaaldehydate, dimethyl terephthalate, and excess alkylene glycol, which prepolymers are crosslinked under certain conditions to yield infusible polyesters having extraordinary adhesion to glass.

One object of the present invention is to prepare novel bifunctional derivatives of methyl azelaalehydate, the principal product obtained from the ozonolysis of methyl oleate.

Another object is the preparation of such monomeric bifunctional derivatives that would be capable of homopolymerizing to a poly(ester-acetal).

A more specific object is to prepare the glyceral monoester of azelaaldehydic acid, i.e., glyceral monoazelaaldehydate, and acetal derivatives thereof that are capable of homopolymerizing to form novel low molecular weight polymers. Another object is the preparation of the glyceryl acetal of methyl azelaadehydate.

The above and related objects will become better understood by reference to the following specification.

Preliminary consideration indicated that two equimolar bifunctional compounds of azelaaldehydic acid and glycerol should be possible, i.e., the glyceryl monoester of azelaaldehydic acid and the corresponding glyceryl acetal, each of which might be capable of homopolymerization to give a poly(ester-acetal).

Attempts to prepare and isolate monomeric glyceryl monoazelaaldehydate by distillation of the products from the ozonization of mono-olein were unsuccessful, apparently because of heterogeneity of the product. To minimize possible condensation reactions of the free aldehyde function it was proposed to isolate the glyceryl monoazelaadehydate as its dimethyl acetal, utilizing di- methoxypropane as a water scavenger. Acetone provided by the potassium bisulfate-catalyzed hydrolysis of the dimethoxypropane reacted with the free hydroxyl groups of the glycerol monoester to form a ketal, namely isopropylideneglyceryl azelaalehydate dimethyl acetal having the structure

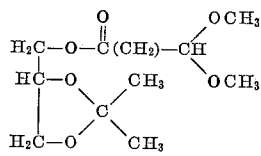

We also prepared isopropylidenegdyceryl azelaaldehydate dimethyl acetal by alcoholysis of methyl azelaaldehydate dimethyl acetal with isopropylidene glycerol by heating at 200° C. in the presence of PbO.

Attempts to obtain the free glyceryl monoazelaaldehydate $$\begin{array}{c} O \\ CH_2O\overset{\|}{C}-(CH_2)-CHO \\ CHOH \\ CH_2OH \end{array}$$

by hydrolysis of the isoproplideneglyceryl azelaaledehydate dimethyl acetal under acidic conditions gave anomalous and entirely unexpected results. Norris, U.S. 2,619,-493, and Baer et al., JACS 67: 2031 (1945) teach that analogous isopropylideneglyceryl esters of simple fatty acids readily hydrolyze under mild conditions to the corresponding α-monoglycerides. However, similar treatments of our novel ester-acetal formed only trace amounts of glyceryl azelaaldehydate even at temperatures as low as −40° C., the free glyceryl ester-aldehyde molecules apparently promptly interacting to provide novel poly(ester-acetal) homopolymers having a D.P. of about 4 to 7 units and corresponding to the following formula:

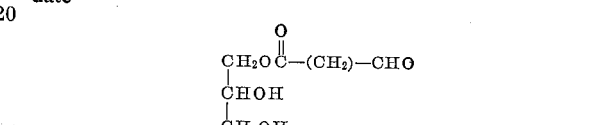

where R is selected from the group consisting of H and Na (depending on whether the polymer has been washed with water or with an aqueous base, e.g., NaOH) and $x$ is an integer having a value of 4 through 7.

The above poly(ester-acetals) are in effect prepolymers which can be further polymerized and/or cured to hard, infusible resins either in bulk or in organic solvent solutions, which can be employed as coating or film-forming compositions.

The liquid-to-spongy prepolymers can be crosslinked to hard infusible resins by heating with an acidic catalyst such as $BF_3$ or a non-oxidative catalyst such as zinc oxide, lead oxide, p-toluenesulfonic acid, or boric acid. Also, our novel prepolymers can be further homopolymerized by heating strongly under vacuum.

It is contemplated that similar ester-acetal homopolymers would be obtained upon hydrolysis-polymerization of ester-acetals from polyols having at least three hydroxyl groups (e.g., glycerol, pentaerythritol) and the $C_8$–$C_{12}$ aldehydic acid homologues of azelaaldehydic acid. Similarly, other ketal or acetal groups could be used to protect the aldehyde group of the acid and the free hydroxyl group of the polyol, e.g.,

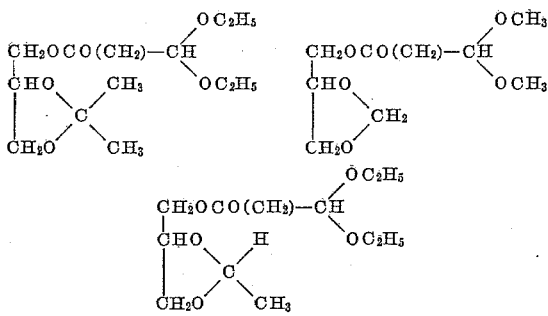

The unexpected formation of the herein disclosed poly-(ester-acetals) by reactions in which the ketal of the glyceryl mono-esteracetal is converted to a polymer at an aqueous-organic interface, thus apparently resembles (co-polymeric) interfacial polymerization; however, it differs in that it is a homopolymerization in which the monomer is entirely in the organic phase, the polymer redissolving and remaining therein, the aqueous phase containing only the catalyst for hydrolysis and polymerization.

The previously mentioned monomeric glyceryl acetal was obtained in yields of 100 percent by glycerolysis of the dimethyl acetal of methyl azelaaldehydate, i.e., methyl 9,9-dimethoxynonanoate as shown in Example 4 or in 65 percent yields directly from the reaction of methyl azelaaldehydate and glycerol as in Example 5. It is believed to have the following structure:

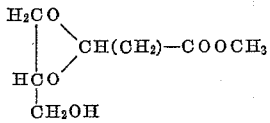

The monomeric glyceryl acetal can be polymerized by heating at atmospheric or reduced pressure in the presence of transesterification catalysts as shown in Table II to provide polymers ranging from soft to hard and/or infusible materials.

As expected, the dimethyl acetal of methyl azelaaldehydate $(CH_3O)_2CH(CH_2)_7COOCH_3$ undergoes cracking when heated in the liquid phase in the presence of an acidic salt and forms the substituted vinyl ether, methyl 9-methoxy-8-nonenoate, corresponding to the formula $CH_3OCH=CH(CH_2)_6COOCH_3$. Since cracking of dialkyl acetals to alkenyl ethers is known to generally occur during the distillation of the acetal if residual acid catalyst or acid-forming salt of any kind is present, we found that thorough washing of the crude acetal products prior to distillation was necessary to prevent lowered yields and reduced purities. However, despite spontaneous distillative cracking of the ester-acetals formed by a sodium methoxide-catalyzed alcoholysis of the ester group of methyl 9,9-dimethoxynonanoate with a diversity of hydroxyl compounds including allyl, n-butyl, and 2-ethylhexyl alcohols, and 2-ethoxyethanol, the corresponding cyclic acetal from glycerol was unexpectedly stable and not subject to cracking, thus permitting the isolation of high-boiling ester derivatives, which otherwise would crack at the elevated temperature necessary for distillation.

The following specific examples are intended to illustrate the invention without limiting the invention thereto.

*Example 1.—Preparation of isopropylideneglyceryl azelaaldehydate dimethyl acetal*

30 g. mono-olein obtained by reacting methyl oleate and glycerol and containing 80 percent α-monoglyceride was ozonized in methanol. The ozonolysis product was isolated as the aldehyde following reduction with zinc and acetic acid: Pryde et al.; Jour. Org. Chem., 25; 618 (1960). Crude glyceryl monoazelaaldehydate (30 g.; 93% yield) was obtained by repeated concentration of the aqueous layer and extraction with methylene chloride. The crude product was refluxed for 4 hours with 100 ml. methanol and 100 ml. dimethoxypropane in the presence of 0.1 g. potassium bisulfate catalyst. After stripping the methanol and most of the unhydrolyzed dimethoxypropane on a steam bath under vacuum, the residue was dissolved in methylene chloride. The solution was first washed with water, then with a saturated NaCl solution, dried with sodium sulfate, the methylene chloride stripped off, and the volatile byproduct pelargonaldehyde acetal removed by distillation at about 0.1 mm. Hg pressure. Distillation of the residue gave a 58 percent yield of isopropylideneglyceryl azelaaldehydate dimethyl acetal, B.P. 152–162° C. (0.07 mm. Hg), $n_D^{30}$ 1.4436.

*Example 2*

Isopropylideneglyceryl azelaaldehydate dimethyl acetal was also prepared by alcoholysis of methyl azelaaldehydate dimethyl acetal (Pryde et al., Abst. 110Q of A.C.S. 140th Meeting, Chicago, September 1961) with isopropylidene glycerol (Renoll et al., Org. Syn., 3; 502 (1955)). Isopropylidene glycerol (13 g., 0.1 mole), methyl azelaaldehydate dimethyl acetal (23 g., 0.1 mole), and 0.2 g. litharge were mixed in a 100 ml. flask fitted with a Claisen still head and nitrogen ebullator. The flask was heated at 190° C. to 222° C. for one hour until the distillation of methanol (2.5 ml., 62% of theory) had stopped. The reaction mixture was filtered and then distilled, yielding 4.0 g. of unreacted isopropylidene glycerol and 8.6 g. of unreacted methyl azelaaldehydate dimethyl acetal.

Isopropylideneglyceryl azelaaldehydate dimethyl acetal was obtained in 52.8 percent conversion and 83.8 percent yield. A redistilled sample having a B.P. of 148° C. to 150° C. at 0.05 mm. Hg had a refractive index of 1.4431. *Analysis.*—Calcd. for $C_{17}H_{32}O_6$: C, 61.42; H, 9.70. Found: C, 61.74; H, 9.64. The infrared spectrum for this preparation was the same as for the ozonolysis product. The nuclear magnetic resonance spectrum also confirmed the structure. In another preparation the substitution of sodium methoxide catalyst for the lead oxide (litharge) gave essentially identical results.

*Example 3.—Hydrolysis-polymerization of isopropylideneglyceryl azelaaledhydate dimethyl acetal*

Isopropylideneglyceryl azelaaldehydate dimethyl acetal (20 g.) was dissolved in 200 ml. benzene. Conc. HCl (200 ml.) was added and the mixture was stirred magnetically in a water bath held at 11°–12° C. for one hour. The benzene layer was separated, washed with fifteen 100-ml. portions of water, and dried over $Na_2SO_4$. The benzene was stripped off, leaving 10.5 g. of a colorless viscous liquid, $n_D^{30}$ 1.4807 which set to a semi-solid on standing. The mol. wt. in a chloroform solution was 1040, equivalent to 5 repeating units.

The acid-hydrolyzed benzene solution from a smaller (5 g.) treatment of isopropylideneglyceryl azelaaldehydate dimethyl acetal was washed with four 25-ml. portions of water and one portion of 5 percent $Na_2CO_3$. The last wash produced a thick emulsion that could be broken only partially by the addition of NaCl and ethanol. After drying over sodium sulfate, the benzene was stripped from the still milky solution under vacuum. To remove residual moisture more benzene was added and then stripped off. The final residue, 2.7 g. (72%), was a white, coarse, foam-like, slightly tacky polymer that softened at 105°–115° C. Its molecular weight was 1560, equivalent to 7 repeating units. The foam-like polymer swells in benzene, dissolves in chloroform with some difficulty, and dissolves readily in water. These properties suggest that the original polymer has an acidic group that can be neutralized to form a salt.

Table I presents data on the properties and yields obtained under different reaction conditons. The highest molecular weights are obtained with one hour of reaction at 11°–12° C. with a 10 percent solution of monomer.

Lowering the concentration of monomer increases the yield at room temperature but does not increase the molecular weight. Ice-bath temperature and longer reaction times are of no significance with benzene. At the lower temperatures, however, methylene chloride is a better solvent because of its lower freezing point, and it gives a better yield with a longer reaction time. Yields of the sodium form of the polymer (via washing with 5% $Na_2CO_3$) are somewhat higher than when water is employed.

TABLE I.—HYDROLYSIS OF ISOPROPYLIDENEGLYCERYL AZELAALDEHYDATE DIMETHYL ACETAL [a]

| Monomer coucentretion, percent | Solvent | Temperature, °C. | Time, hours | Washed with— | $n_D^{30}$ | Molecular weight | Yield, percent |
|---|---|---|---|---|---|---|---|
| 10 | Benzene | 24–30 | 1 | Water | 1.4736 | | 60 |
| 5 | do | 23–31 | 1 | do | 1.4717 | 550 | 69 |
| 10 | do | 11–12 | 1 | {Water, $Na_2CO_3$} | 1.4807 (Solid) | 1,040 1,500 | 77 |
| 5 | do | 5–6 | 1 | Water | 1.4806 | 720 | 71 |
| 5 | do | 5–7 | 2 | do | 1.4785 | 820 | 71 |
| 5 | do | 5 | 6 | do | 1.4760 | 750 | 68 |
| 5 | $CH_2Cl_2$ | 1–3 | 6 | do | 1.4704 | 850 | 86 |
| 10 | Benzene | 27–34 | 1 | $Na_2CO_3$ | (Solid) | | 77 |
| 10 | do | 26–27 | 0.25 | $Na_2CO_3$ | (Solid) | | 72 |
| 5 | do | 25–32 | 1 | $Na_2CO_3$ | (Solid) | | 88 |

[a] All hydrolyses were run with concentrated hydrochloric acid. Sodium carbonate wash solution was 5% concentration.

*Example 4*

Methyl azelaaldehydate dimethyl acetal (4.30 g., 0.018 mole), glycerine (5.00 g., 0.054 mole), and potassium acid sulfate (0.10 g.) were heated in a 25-ml. round-bottom flask, fitted with a nitrogen ebullator, thermometer, and distillation head, for 3 hours at 120°. The reaction mixture was cooled and then taken up in methylene chloride and filtered. The filtrate was washed several times with water and then dried over anhydrous sodium sulfate. After the solvent was stripped off under vacuum, the residue weighed 4.93 g. (100% of theory); GLC analyses indicated the obtained glyceryl acetal of methyl azelaaldehydate was pure.

*Example 5*

For comparison, the glyceryl acetal of methyl azelaaldehydate was prepared directly: methyl azelaaldehydate (27.93 g., 0.15 mole), glycerine (13.80 g., 0.15 mole), and ammonium chloride (0.01 g.) were heated at 105–115° in a 125-ml. round-bottom flask fitted with a thermometer, a nitrogen capillary for obtaining mixing of the phases, a Vigreux column, and a distillation head. At the end of 2 hours the reaction mass was homogeneous, and water had condensed on the upper part of the flask, column, and head. The water was removed by heating at 90° and about 50 mm. Hg for about 15 minutes. The solution was cooled, diluted with methylene chloride, filtered, and distilled. A main fraction boiling at 150–156° at 0.45 mm. Hg was collected for a yield of crude product of 65 percent. Redistillation gave a product boiling at 146° at 0.2 mm. Hg.

*Example 6*

2 g. of the methyl axelaaldehydate glyceryl acetal of Example 5 and 20 mg. of calcium oxide catalyst were placed in a 30 cm. test tube having a side arm and a nitrogen ebullition inlet and the material was heated at 160°–210° C., with constant ebullition, at 0.1–0.04 mm. Hg for 13 hours to provide a soft, waxy, ivory colored solid. A second 20 mg. portion of CaO catalyst was added and heating was resumed at 200°–259° C. for 1 hour to provide a light brown crystalline polymer melting at 61.5°–62.5° C. and having a molecular weight of 6000 (see Expt. 39 of Table II). Table II also presents data on other conditons for polymerization of methyl azelaaldehydate glyceryl acetal and the properties of the polymers obtained.

TABLE II

| Expt. No. | Catalyst | Temp., °C. | Pressure (mm. Hg) | Hours | Polymer |
|---|---|---|---|---|---|
| 39 | CaO | 160–210 | 0.1–0.04 | 13 | Ivory color wax-like solid. |
|  | (2d phase) | 200–259 | 0.05 | 1 | Lt. brown, crystalline, M.P. 61.5–62.5° C., mol. wt. 6,000. |
| 43 | CaO | 184–204 | 0.05 | 4 | |
|  | (2d phase) | 241–265 | 0.04 | 1 | Soft, tacky, only partly polymerized. |
| 48 | CaO | 198–206 | 760 | 3 | |
|  | (2d phase) | 162–191 | 0.15 | 3¼ | Red, tacky, sl. elastic, M.P. 60–70° C.; insol. in ethanol, acetone, $CCl_4$; mol. wt. 2,650. |
| 50 | CaO | 252–272 | 760 | 1½ | |
|  | (2d phase) | 210–241 | 0.1 | 3 | |
|  | (3d phase) PbO | 238–246 | 0.3 | 1 | Dk. brown, tough, elastic; M.P. 68–80°; insol. in ethanol, acetone, $CCl_4$. |
| 36 | $Sb_2O_3$ | 191–196 | 760 | 4 | |
|  | (2d phase) | 196–280 | 1.0 | 1 | Amber, tacky, elastic, infusible. |
| 37 | PbO | 191–196 | 760 | 4 | |
|  | (2d phase) | 196–280 | 1.0 | 2¼ | Brownish black, rubbery, infusible. |

We claim:

1. The monomeric glyceryl 1,2-acetal of methyl azelaaldehydate, having the following structure

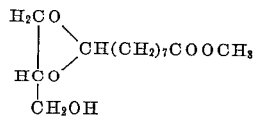

2. The crystalline polyester melting at 61.5–62.5° C.

and having a molecular weight of 6000, said polyester being the homopolymer obtained by refluxing the monomeric glyceryl acetal of methyl azelaaldehydate at 160–210° C. and at 0.1–0.04 mm. pressure for 13 hours with constant nitrogen ebullition and in the presence of at least 1 percent by weight of the monomer of calcium oxide catalyst, then adding additional calcium oxide and refluxing at 200–259° C. for 1 hour.

References Cited by the Examiner
UNITED STATES PATENTS 3,092,597  6/1963  Leech et al. _____ 260—75

SAMUEL H. BLECH, *Primary Examiner.*
WILLIAM H. SHORT, *Examiner.*
L. M. MILLER, *Assistant Examiner.*

UNITED STATES PATENT OFFICE
CERTIFICATE OF CORRECTION

Patent No. 3,287,326                        November 22, 1966

William R. Miller et al.

It is hereby certified that error appears in the above numbered patent requiring correction and that the said Letters Patent should read as corrected below.

Column 2, line 9, the formula should appear as shown below instead of as in the patent:

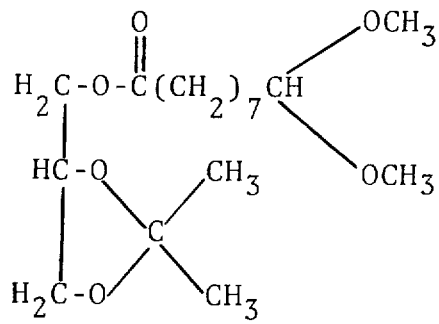

same column 2, line 22, the formula should appear as shown below instead of as in the patent:

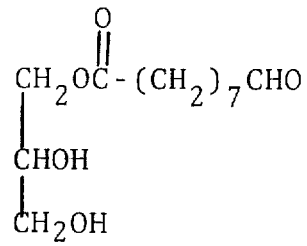

same column 2, line 40, the formula should appear as shown below instead of as in the patent:
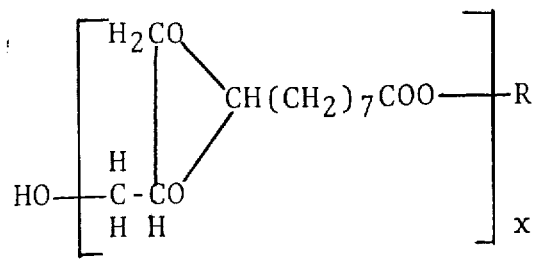
column 3, line 3, the left-hand formula should appear as shown below instead of as in the patent:
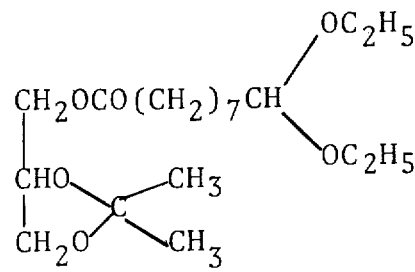
same column 3, line 3, the right-hand formula should appear as shown below instead of as in the patent:
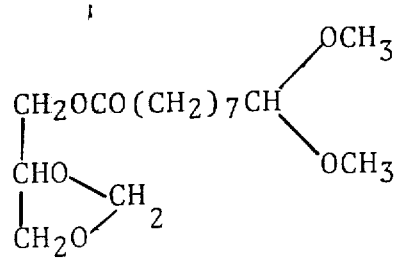
same column 3, line 11, the formula should appear as shown below instead of as in the patent:

3,287,326

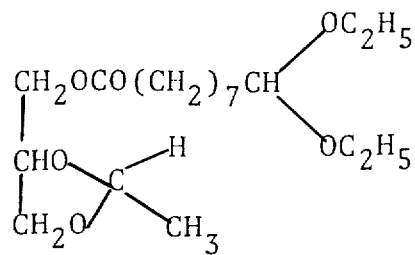

same column 3, line 35, the formula should appear as shown below instead of as in the patent:

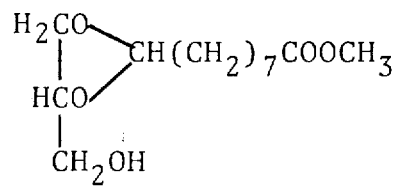

Signed and sealed this 12th day of September 1967.

(SEAL)
Attest:

ERNEST W. SWIDER
Attesting Officer

EDWARD J. BRENNER
Commissioner of Patents